Patented Oct. 30, 1945

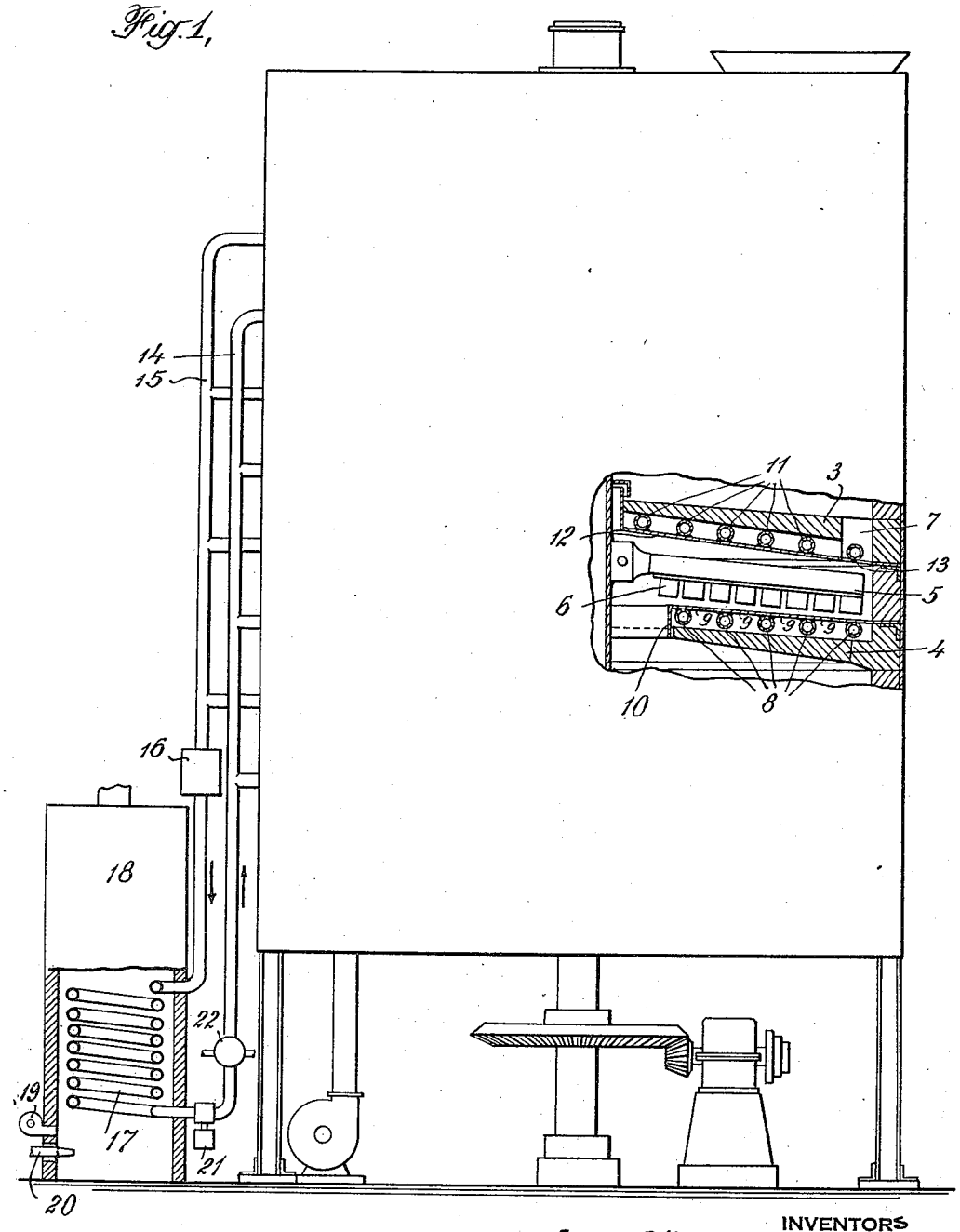

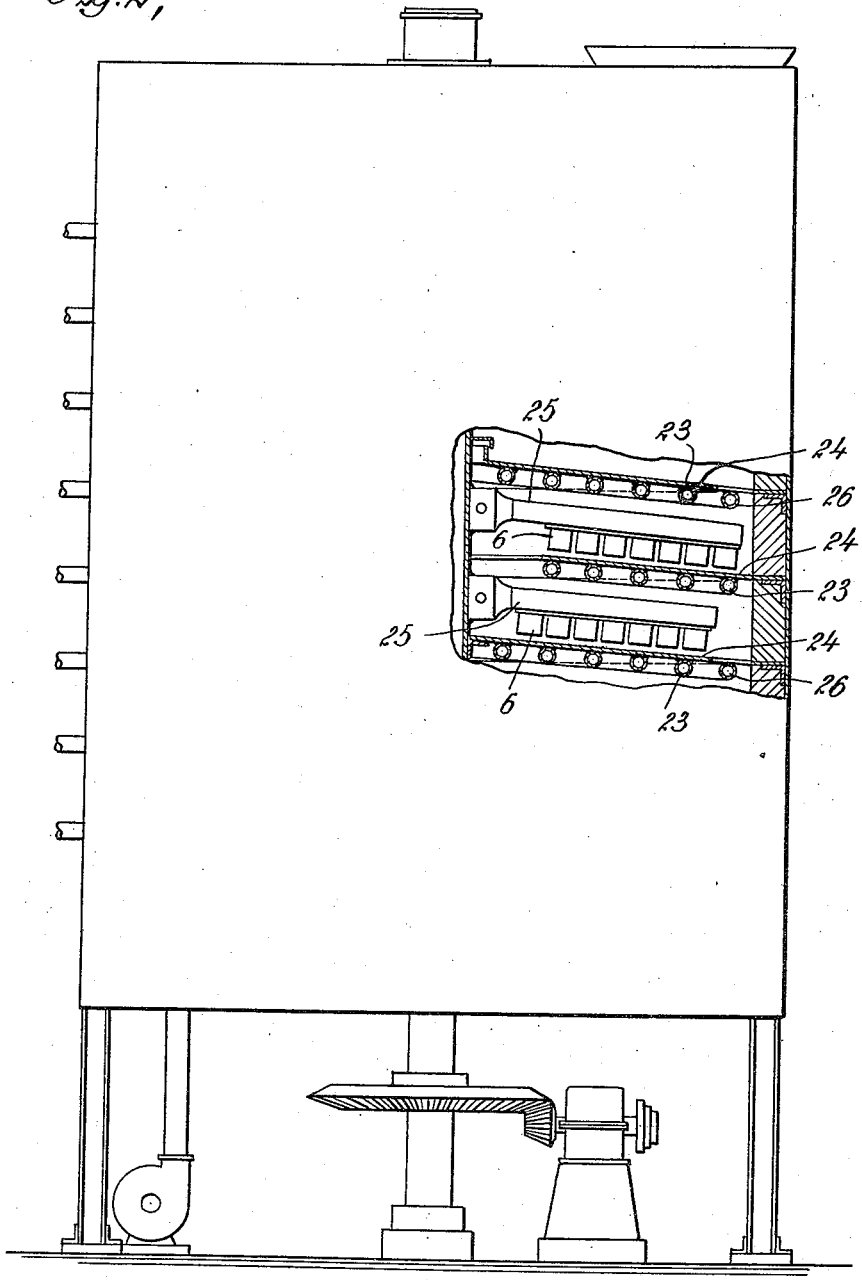

2,387,936

UNITED STATES PATENT OFFICE 2,387,936

METHOD OF REGENERATING SPENT ADSORBENTS

Edward S. Nicholls, Woodbury, Henry D. Noll, Wenonah, and John W. Payne, Woodbury, N. J., assignors to Socony-Vacuum Oil Company, Incorporated, New York, N. Y., a corporation of New York Application March 19, 1940, Serial No. 324,776

2 Claims. (Cl. 252—281)

This invention relates to the treatment of solid materials in particle form with gases or vapors, under exothermic or endothermic conditions, at closely controlled temperatures. Such operations are used in the regeneration of spent adsorbent materials, the roasting or calcining of ores, the processing of Portland cement ingredients, and similar processes. The regeneration or reactivation of spent solid granular adsorbent material such as fuller's earth used in a decolorizing filtration, as for example on petroleum oils, is typical and presents most of the problems presented by any similar operation.

In regeneration of petroleum filter clays, for instance, as carried out today, the clay suffers a loss in efficiency with each burning or regeneration until finally it cannot be regenerated to a sufficiently high activity to warrant further regeneration, at which time the clay is discarded to waste. Since clays which have had a different number of burnings have different efficiencies, they are usually kept separate and separately classified. In general filter clays are only regenerated about five to eight times and practically never more than ten to fifteen times before they are thrown away.

The problem of regenerating clays is complicated by the sensitivity of the clays to high temperatures. While temperatures around 900°–1150° F. are desired to burn off impurities from the clay, temperatures around 1300° F. may permanently injure the clay. Moreover, if the temperature falls too low, inefficient regeneration results. The problem of keeping the temperature of the clay within safe limits is greatly increased since the combustion reaction involved in burning off the impurities evolves considerable amounts of heat and can very easily become so rapid as to get beyond control temporarily, either generally or locally. Probably one of the principal reasons for the successive losses in activity of regenerated clay is the fact a certain amount is overheated or underheated each treatment. In view of the fact most clays to be regenerated have more than enough carbonaceous material deposited thereon to furnish the heat required for regenerating, it is quite probable that present methods in general permit overheating; this appears to be true, moreover, from the fact it would be extremely difficult to control precisely the temperature of all the clay in present methods.

This invention has for an object the provision of a process and apparatus whereby solid particles may be treated at elevated temperatures under accurately controlled temperatures during the period of treatment.

A further important object is the provision of a process and apparatus wherein a granular porous adsorptive material is suitably brought into contact with an activating gaseous medium while controlled temperature conditions are maintained.

In the present invention, solid particles are treated by being mechanically progressed, with agitation, across a series of zones of controlled temperatures in which they are contacted, countercurrently with gaseous agents at controlled temperatures.

As has been indicated above, the present invention may be used in the treatment of finely divided solids in general. Particularly typical of materials that may be treated by our invention are those spent filter clays and adsorbents derived from the filtration of mineral oil products such as waxes, turbine and transformer oils and particularly the usual lubricating oils; also from the filtration of vegetable oils; sugar liquors; etc. These spent clays or other adsorbents contain adsorbed combustible materials such as tarry, oily or carbonaceous matters and are regenerated for re-use by the heating or burning of the organic material adsorbed thereon. In some instances it may be desirable to burn off only inactive organic impurities while carbonizing a part of the carbonaceous impurities to form an active carbon layer on the adsorbent.

Other typical materials which we may treat are finely divided solid catalytic materials which have been used in some catalytic process of refining or conversion until sufficiently contaminated with impurities that regeneration or revivification is required or desirable and wherein the inactive impurities deposited on the catalyst are removed by treating the catalytic material at elevated temperatures. For instance, in the catalytic cracking of petroleum oils using a finely divided solid catalyst material, e. g., clay-type catalysts, the catalyst becomes contaminated with a carbonaceous deposit of the nature of coke which must be removed from time to time in order to regenerate the catalyst, and this removal is usually effected by burning off the impurities at closely controlled elevated temperatures.

For convenience the present process will be described in detail with respect to regeneration of filter clay. However, it is to be understood the invention is not limited thereto but is directed to the whole field of regeneration of spent adsorbents and catalysts by burning off inactive impurities as well as to the initial preparation of same when necessary including activating, drying, hardening and the like by the application of heat. Likewise the present process as has been stated may be used to advantage for the heat treatment of finely divided solids in general, as, for instance, in roasting of ores, showing decided advantages for treatments wherein close temperature control is a necessity or a highly desirable condition and reactions are involved which produce or consume a considerable amount of heat.

In order that our invention may be readily understood, reference is now made to the drawings attached hereto in which Fig. 1 is a diagrammatic showing of an appropriate apparatus and Figure 2 is a partial view of a modification thereof.

It may be seen from Figure 1 that our apparatus is a modified multiple hearth kiln of the type commercially represented by the Wedge and by the Nichols-Herreshoff furnaces or kilns. However, we have modified this type kiln in an important respect by certain accessories for controlling temperature conditions in said kiln, as shown in detail in Figure 1, wherein 3 and 4 are two of the refractory hearths of the kiln and 5 is one of the rabble arms operating therebetween, from which depend plows or rabbles 6. The course of the solid material is outward, roughly radially, across hearth 3, down through port 7, and inward, roughly radially, across hearth 4, being advanced and rabbled by plows 6. The course of the gaseous treating reagent is countercurrent to the solid, i. e., radially outward above 4, up through 7 and radially inward across 3, as is well known. To this structure we have added heat control means by placing above hearth 4 the conduction heat control tubes 8 to which are attached plates 9 which form in effect a new surface for hearth 4, completed by curtain plate 10. For further temperature control, if necessary, radiant temperature control tubes 11 are installed upon the under side of hearth 3. These tubes 11 may be equipped with extended surface which may take either the form of plate 12, forming a surface covering the tubes, or which may be any form of fin structure. Additionally, a combined conduction and radiation control tube 13 may be placed, if desired in port 7. Similar constructions, in whole or in part, are applied to other hearths of the multiple hearth furnace, and for best results we prefer to equip each hearth with equivalent heat control means.

Through all of these tubes there is circulated a fluid heat transfer medium at controlled temperature appropriate to the reaction being conducted. This is accomplished by means of exterior inlet manifold 14 and outlet manifold 15. Pipe 15 leads to a surge tank 16, which is connected with a coil 17 placed in a chamber 18 wherein heat may be added by burner 20 or extracted by fan 19. The medium is circulated by pump 21 and heat exchanger 22 may be used, if desired, for complete or further control of the temperature of the medium. All of this is shown in quite diagrammatic form and any similar or equivalent agencies for accomplishing the addition or removal of heat from the circulating fluid heat transfer medium may be made. Also, suitable manifolding may be arranged whereby, by mixing hot and colder medium, individual hearths may be held to temperatures differing from that of their neighbors.

Figure 2 shows partially and diagrammatically a modification of apparatus, wherein the refractory hearths are discarded and replaced in whole or in part by heat control hearths which combine the conductive and radiant heat control functions. Such hearths, as may be seen, are based upon and supported by tubes 23, the extended surface of which forms the hearths 24. As before, rabble arms 25 are provided, and if desired, so are combination tubes 26.

It will be realized that these two variations have in common the ability to control accurately the temperature of the solid materials moving across the hearth and the gaseous materials moving above it. Other combinations and arrangements of heat control tubes in, upon, and around the hearth may be made to the same end. All such we consider to be the equivalent of those herein disclosed.

The scheme of operation is as follows: The solid material progresses across the hearths and downward from hearth to hearth as in the conventional furnace, being plowed, agitated, or rabbled, and forced through the apparatus by the rabble arms and plows in the usual fashion. The fluid heat transfer medium circulated through the tubes at controlled temperature establishes the heat conditions of the operation for any hearth and throughout the furnace. Heat may be furnished an endothermic reaction and heat may be removed from an exothermic reaction. If the reaction be a combination of these as for filter clay, different hearths may perform different functions, heat conditions being established appropriately. For example with clay, the top hearth may preheat, the second heat to initiate combustion, several subsequent hearths remove exothermic heat of combustion, and the final hearth may cool.

Several advantages flow from the method of operation. The most important of course is the uniform treatment with ability to completely avoid overtreatment which is discussed elsewhere in this specification.

A further advantage arises from the fact that since an independent source of heat is available, combustion need not be one of the functions of the treating gas and complete control over the nature of this reagent may be established.

A further and important advantage arises, particularly in processing filter clays and similar material in that, being free of the necessity to introduce excess air in large quantities for temperature control, advantage may be taken of the fact that such solids usually contain enough combustible to accomplish their own heat treatment without the use of additional fuel.

An important feature of the present invention is the proper use of fluid heat exchange medium and the structure whereby the solids are intimately contacted with counter flowing gases while each individual particle of the solids, during substantially the entire duration of the reaction, is within sufficiently close proximity to the heat exchange medium that no deleterious temperature condition is created.

In order to obtain proper temperature control, the heat exchange medium must be adjusted to a proper temperature, for extracting or adding the necessary heat. Moreover, heat exchange medium must be flowed in sufficient amount in close indirect heat exchange with every solid particle and then cooled or heated to readjust its temperature by means extraneous of the reaction heat before the medium's temperature reaches an undesired value. In this way the heat exchange medium in our invention continuously controls the temperature of the zone making immediate compensations for temperature changes whereby no deleterious temperatures occur.

When the operation is first started the heat exchange medium may add some heat to help initiate the reaction or treatment, or at least the medium should not be at such a low temperature as to substantially hinder such initiation. After the operation is started the exchange medium is circulated throughout the zone adding or abstracting heat as required. In our invention the heat exchange medium is maintained at all points in the regenerating zone at a temperature below temperatures which cause substantial damage to the clay (or if other operations are being conducted, below temperatures which cause heat damage thereto), and, of course, at a temperature above which undue cooling occurs so that the regeneration (or other treatment) cannot proceed efficiently. For instance, in the usual regeneration of filter clays and the like we preferably maintain the heat exchange medium at a temperature around 850°–900° F. and never above about 1050° F. By so controlling the heat exchange medium and flowing a sufficient amount within sufficiently close indirect heat exchange with each particle, a close uniform temperature control is maintained over every particle so that no deleterious temperatures occur which cause injury to the particles or treating operation. Moreover, the entire zone will be maintained under the same close uniform conditions.

While temperature-controlled, circulating gaseous heat exchange mediums of high specific heat might be used in some instances, we greatly prefer the use of liquid heat exchange mediums since necessary pumping and pressure facilities for proper use of even the best gaseous mediums, e. g., hydrogen, would, in many instances, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of clay, we prefer the use of fused salts. A particularly preferable mixture of this kind is a mixture of the alkali metal salts of nitric and nitrous acids. In certain cases suitable liquid heat exchange media might be found which have a boiling point around the desired operating temperature, in which case, the heat exchange medium, although mostly in the liquid state, might undergo some transition whereby advantage could be taken of its heat of vaporization or condensation. By the use of liquid heat exchange medium and by having them in sufficiently close proximity to all particles undergoing reaction an extremely close and uniform temperature control may be maintained.

In the preferred practice the heat exchange medium is maintained at substantially the temperature of the treatment being controlled. Such practice may be carried out feasibly because the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and if the fluctuation is too great suitable cooling or heating of the heat exchange medium in its circuit will still maintain the liquid at the treating temperature. Thus if a sharp brief rise in temperature occurs which normally would damage the clay before it is indicated, if ever, on a temperature responsive device and suitable manipulation effected to offset the rise, in the present method the liquid heat exchange medium would immediately and automatically offset the rise by absorbing any excess heat so that deleterious temperatures would not be created. Likewise if the temperature fell off sharply so that normally the temperature would go so low that inefficient regeneration would result, this fluctuation likewise would be immediately and automatically offset by the liquid heat exchange medium which would add heat to the cooling granules.

As a result of the close uniform temperature control afforded by our invention many important advantages are obtained. For instance, in the regeneration of filter clays the customary loss in efficiency with each regeneration may be substantially reduced or even eliminated. Further, the operation may be substantially changed. In customary practice great excesses of air over the theoretical amount required for combustion are used in order to afford cooling. As a consequence the combustion is not conducted as efficiently as an exothermic reaction might be and generally additional fuel must be added to the clay. Since we have close uniform control over the apparatus the amount of excess air used may be substantially reduced or eliminated whereby the expense of added fuel is correspondingly reduced and further the heat exchange medium may even extract heat rather than add heat.

A sufficient amount of heat transfer surface should be installed, and sufficient provision should be made for circulation of fluid heat transfer medium and temperature adjustment thereof, that the desired control may be accomplished. Since these quantities may be varied widely dependent upon the reaction being carried out, they cannot be closely specified. They can be exemplified, however, by citing conditions pertinent to the treatment of spent filter clays contaminated with carbonaceous material and oil and to the treatment of contaminated clay-like catalytic materials. Since both of these must be at or above about 800° F. to burn and since both may be damaged by temperatures in excess of about 1100° F., the rate of heat removal should be such as to permit removal of carbonaceous matter at rates ranging from about 1% to about 10% of carbon (based upon weight of clay fed per hour) with probable preferred range of operation being around 3% to 6% of carbon per hour, while not permitting rise of clay temperature above about 1100° F.

The exact figures of course will depend upon the rate of feed of solid material through the furnace, which, in the case of the above noted clays, may range from about one to about eight pounds per hour per cubic foot of kiln volume with a preferred range of from about two to about five pounds per hour per cubic foot of kiln volume.

An important feature of this invention is the ability to obtain accurate temperature control. That accurate temperature control is of importance is readily proven by the fact that spent petroleum filter clay when treated under conditions usual in the art must be discarded after about five burns, while, if treated under proper and accurate temperature control, it is substantially unimpaired in filtration efficiency even after 15 to 20 regenerations.

Throughout this specification and in the claims, the terms solid particles, solids, solid materials, etc., where applicable, mean not only the solid but also any other solid or liquid matter that may be associated therewith, as for example, the carbon and oil associated with a spent filter clay which is undergoing treatment.

We claim:

1. In a method of regenerating a spent particle-form adsorbent carrying carbonaceous impurities by burning, the improvement which comprises: rabbling the adsorbent across each of a series of substantially horizontal hearths and passing it downwardly through said series while passing combustion supporting air upwardly through and across said hearths in a direction generally countercurrent to the flow of said adsorbent, and subjecting the adsorbent upon each of said hearths to indirect heat exchange with a confined flowing fluid heat exchange medium which medium is at such a temperature and utilized in such quantities as to maintain the adsorbent upon each hearth between the minimum combustion temperature and the maximum temperature which does not damage said adsorbent.

2. In a method of regenerating a spent particle-form adsorbent carrying carbonaceous impurities by burning, the improvement which comprises: rabbling the adsorbent across each of a series of substantially horizontal hearths and passing it downwardy through said series while passing combustion supporting air upwardy through and across said hearths in a direction generally countercurrent to the flow of said adsorbent, and subjecting the adsorbent upon each of said hearths to indirect heat exchange with a confined flowing fluid heat exchange medium which medium is held between about 850° F. and about 1050° F. and is utilized in such quantities as to hold the adsorbent upon each hearth between about 900° F. and about 1150° F.

EDWARD S. NICHOLLS.
HENRY D. NOLL.
JOHN W. PAYNE.